United States Patent [19]

Kroll

[11] Patent Number: 5,143,623
[45] Date of Patent: Sep. 1, 1992

[54] NUTRIENT AND PARTICLE REMOVAL: METHOD AND APPARATUS FOR TREATMENT OF EXISTING LAKES, PONDS AND WATER BODIES

[76] Inventor: Brian L. Kroll, 4515 Verity, Sanford, Mich. 48657

[21] Appl. No.: 716,273

[22] Filed: Jun. 17, 1991

[51] Int. Cl.⁵ .................. B01D 21/01; B01D 21/02
[52] U.S. Cl. .......................... 210/705; 210/800; 210/170; 210/242.1; 210/206; 210/535
[58] Field of Search ............... 210/170, 800, 702, 804, 210/703, 805, 704, 803, 153, 198.1, 705, 205, 714, 206, 715, 207–209, 220, 723, 252, 729, 170, 747, 242.1, 241, 513, 521, 522, 532.1, 533, 534, 535

[56] References Cited

U.S. PATENT DOCUMENTS

| | | | |
|---|---|---|---|
| 2,673,451 | 3/1954 | Gariel | 61/2 |
| 4,202,778 | 5/1980 | Middlebeek | 210/521 |
| 4,209,388 | 6/1980 | DeFraites | 210/8 |
| 4,298,471 | 11/1981 | Dunkers | 210/170 |
| 4,507,206 | 3/1926 | Hughes | 210/739 |
| 4,614,458 | 9/1986 | Austia | 405/74 |
| 4,701,260 | 10/1987 | Lee | 210/521 |
| 4,948,518 | 8/1990 | Targay | 210/802 |
| 5,008,075 | 4/1991 | Rufolo | 210/170 |

Primary Examiner—Frank Sever

[57] ABSTRACT

A method and apparatus for capturing descending particle matter and chemical precipitate so that this material can be removed from a water body on a timely basis to remove offending nutrients. This method uses a plurality of funnel shaped collection chambers each attached at its apex to a collection conduit. Descending particle matter and precipitate concentrates at the apex of the chamber where a flow control valve closes upon activation of a suction on the receiving conduit so that external flow is restricted and flow velocity within the tube is maximized to aid suspension and removal of accumulated material. A tube selector is utilized to apply suction to only one collection conduit at a time, and a chemical feed apparatus is employed to produce the chemical precipitate above the receiving chambers. By this method, nutrients and particle matter can be removed from water bodies thus restoring their water quality.

35 Claims, 4 Drawing Sheets

NUTRIENT AND PARTICLE REMOVAL: METHOD AND APPARATUS FOR TREATMENT OF EXISTING LAKES, PONDS AND WATER BODIES

FIELD OF THE INVENTION

This invention relates to the separation and removal of particles and chemically induced precipitate from liquids with particular application to existing water bodies of considerable size for nutrient removal and water quality improvement purposes.

BACKGROUND OF THE INVENTION

The need for good water quality is well established. Waste water treatment facilities need to meet certain water quality parameters in their discharges. Industrial water needs to meet certain minimums before it can be used. Drinking water must meet very rigid standards before it is acceptable for human consumption. And recreational waters must be of high quality for general use.

Water quality is diminished by suspended particles, higher than acceptable concentrations of nutrients, and by toxic materials. In order to effect more than symptomatic and palliative improvement in water quality, the particle matter, nutrients, and toxins must be removed. Without removal, nutrients and toxins are recycled again and again in open waters until eventually flushed from the system or buried in the sediments to the point of becoming unavailable (1).

Previous inventions have not attempted or have not been successful at removing large amounts of nutrients from quiescent water bodies with low concentrations of nutrients. Hughes U.S. Pat. No. 4,507,206) understood the role of nutrients and particularly phosphorus in the aquatic system. His patent would inactivate phosphorus to limit eutrophication in receiving waters but would require continuous additions of precipitating agent including additions to input streams and point source discharges. Resources to accomplish this in most complex watersheds would be extensive and since nutrient or particle removal is not a part of his invention, if the process were discontinued there would be reverting or even increased eutrophication of the water body within a short time. Also, the non-removal of sediments and addition of material by this patent would allow sediments to continue to accumulate and may even accelerate sediment buildup, a situation opposed to lake restoration. One time, chemical precipitation projects have been used to help with lake restoration (9) when used in conjunction with nutrient curtailing activities.

Nutrients and toxins are generally contained in particle matter either as a result of biomagnification or simple adsorption to organic and inorganic particles. The DeFraites U.S. Pat. No. 4,209,388 shows the usefulness of allowing unwanted nutrients to first become incorporated into organic organisms which are then separated from the water. His method requires a series of ponds, probably man made at great expense of land and energy, and is of questionable effectiveness when the concentration of nutrients is relatively low as it is in natural waters rather than the high concentrations of the sewage water of his invention.

The nutrients found in natural aquatic systems are very difficult to remove. One reason is the very low concentrations. In north temperate waters concentrations as low as 0.020 mg/l phosphorus can cause water quality problems and concentrations above 0.030 mg/l phosphorus are almost always detrimental. Also, the phosphorus is mostly contained in very small particles (2) of specific gravities near that of water. These small particles of algae, bacteria and detritus can be removed by sand filtration (3) and through settling chambers of waste water treatment plants (4) but these methods are very expensive, require extensive pumping, and are not efficient at treating large bodies of water. Aquatic weeds are sometimes harvested for nutrient removal (5) but efficiency is small (about half a kilogram per ton of weeds removed) and limited to lakes where weeds grow in accessible regions and limited to a few cuttings per year.

Several previous inventions have made attempts at removing fine particle matter from liquid suspensions. Lee's U.S. Pat. No. 4,701,260 uses a lamella separator to concentrate particle matter and remove the resulting sludge on a conveyor. Middlebeek's U.S. Pat. No. 4,202,778 shows a similar device except that it discharges its sediment accumulation through a bottom orifice and the lighter materials through an upper orifice, the entire chamber being under pressure. U.S. Pat. No. 4,948,518 by Turgay also uses separation chambers and a funnel shaped bottom to separate and remove a suspension of sewage sludge after proper contact time and agitation. These inventions require complex processes, regulated flow, continuous maintenance, a number of pumps and sludge handling devices, and considerable energy to treat small volumes of flow and are generally unsuitable for installation in existing bodies of water.

Gariel U.S. Pat. No. 2,673,451 took his invention in situ in an attempt to treat greater volumes of water at minimal hydraulic head loss. Although his apparatus may accomplish specific goals of reducing particle matter in the stream, it requires a flow of water across the settling plates and the long path of the settling material would allow most of the particles to be mineralized and their nutrients returned to the water prior to their removal.

Dunkers U.S. Pat. No. 4,298,471 continues with the in situ concept in that his invention adapts flow control of polluted inputs to the existing water body through a means of impervious curtains so that the polluted incoming water is contained. Although helpful, this device would have to be used at each major pollution source and requires pumping of all the inflow for treatment by conventional means. Also, this method would have little use where the pollution sources are diverse and uncontrollable. The permanent dredge system by Austin, U.S. Pat. No. 4,614,458, is an in situ system of removing accumulating sediment material. His system relies on stream accumulation of heavy sediment material and is principally a system of maintaining depth. Installing such an apparatus would require considerable marine construction, large volume grit pumps, would not be acceptable for smaller water bodies such as recreational ponds, and would not be efficient at retaining or removing low specific gravity and nutrient rich particle material.

The common path for phosphorus in natural lakes will illustrate the need for a new method of removing nutrients and particles from these, and other, quiescent water bodies:

Phosphorus in dissolved form enters the lake with stream flow or precipitation. Phosphorus also enters via terrestrial sources such as particle matter washed in by overland flow or blown in as dust, leaves, and debris (6). The particle matter is quickly mineralized releasing its nutrients. Regardless of the source, the newly entered phosphorus is quickly taken up by microscopic planktonic algae as the phosphorus becomes available. The algae either die and sink after their natural life span of about seven days or the algae is eaten by zooplankton. Zooplankton eat a great deal of the phytoplankton crop and pass fecal pellets of partially digested remains (10). Dead algae and zooplankton fecal pellets continually "rain down" through the water column. These microscopic particles account for the majority of phosphorus being "lost" from the upper water (7). Limnologist commonly sample the sinking fraction of particle matter in lakes using collection tubes suspended vertically in deep water (11) (12).

If these nutrient rich particles fall into the deep portions of the lake greater than six meters deep, the phosphorus they contain is lost for the season in the cold waters of the hypolimnion (8) which tends not to mix with the upper waters until fall overturn. If the particles fall in the shallow warm areas of the lake, they quickly decompose and release their phosphorus back into the water for uptake by the next generation of algae and weeds (2) (7). This cycling of phosphorus continues all summer long with cycle times of only one to two weeks, especially in shallow water bodies. The challenge is to capture these descending particles and remove them from the lake or pond on a daily basis (approximately) thus removing the accompanying phosphorus.

SUMMARY OF THE INVENTION

Accordingly, several objects and advantages of my invention are to provide a method and apparatus to intercept descending particle matter and remove this matter on a daily or other short cycle so that the majority of the nutrients contained in this matter is removed before it can be leached back into the water. In addition, the invention is designed to intercept and remove chemically induced precipitate which will further remove unwanted particles, toxins, and dissolved nutrients from the overlying water.

Figure 1:
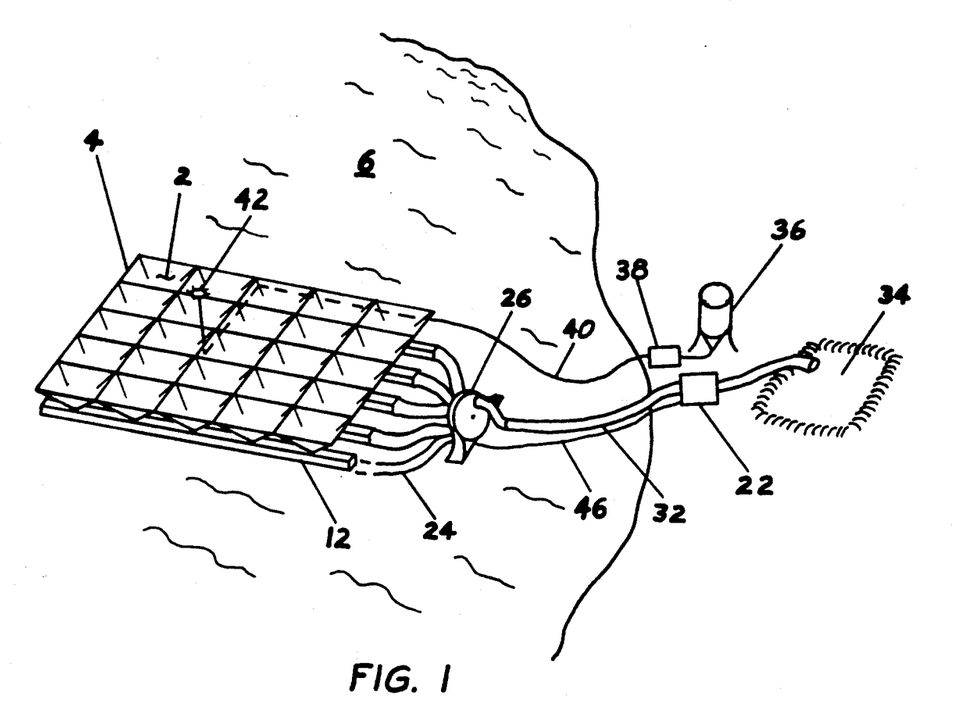
FIG. 1 shows an isometric view of the overall invention.
Figure 2:
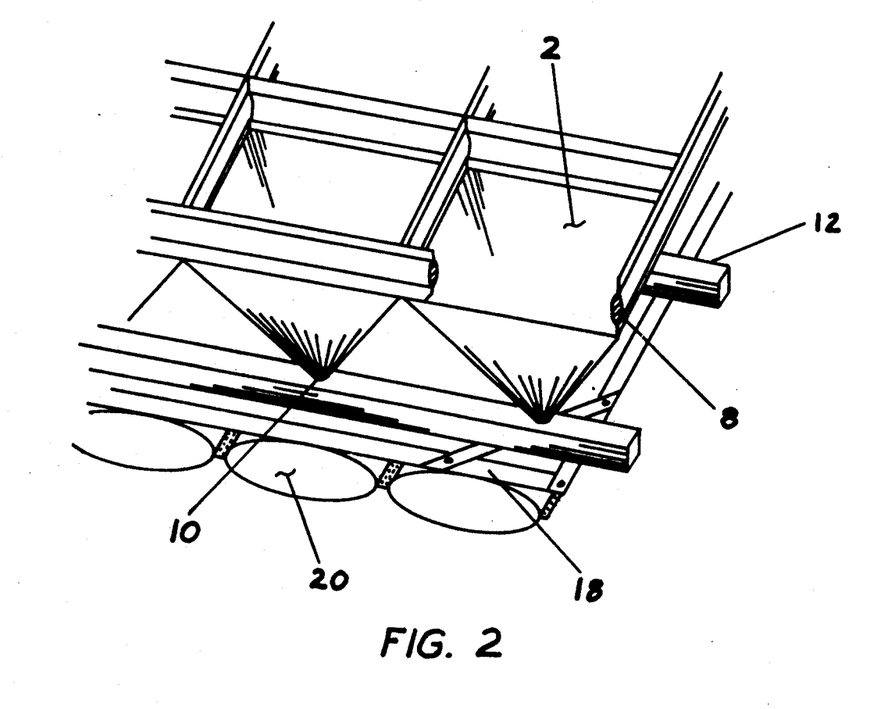
FIG. 2 shows a close-up of the claims gravitational separation chambers.

The method uses a plurality of funnel shaped chambers 2 attached side-by-side to form a sheet 4 covering a planar area of the bottom of the water body 6. Each chamber is held open by buoyant material 8. These chambers 2 are attached at their apexes 10 to a receiving conduit 12. The descending particle matter or chemical precipitate is captured by the funnel shaped chambers 2 and concentrates at each chamber's apex 10. The apex 10 is open to the horizontal conduit 12 so that much of the descending material enters the conduit and is confined there until removal is activated. This confinement helps to also confine the nutrients being disassociated from the particle matter during the non-withdrawal phase of the cycle so nutrient return to the overlying water is minimized.

Figure 3:
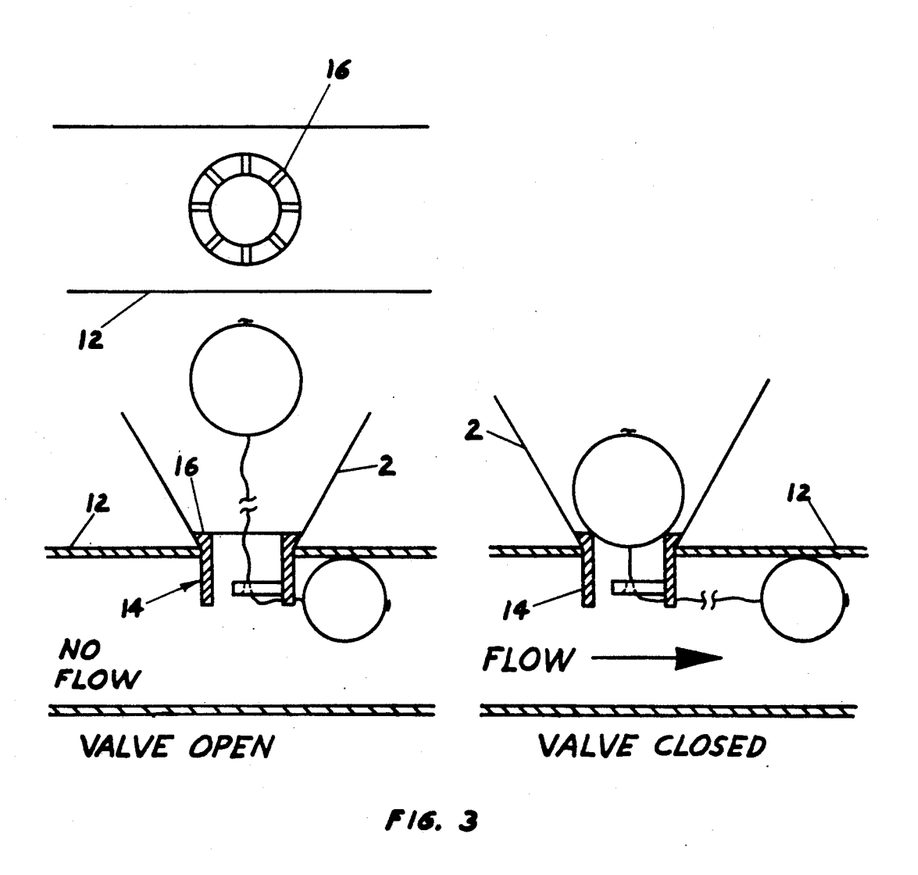
FIG. 3 shows a first embodiment of valve means.
Figure 4:
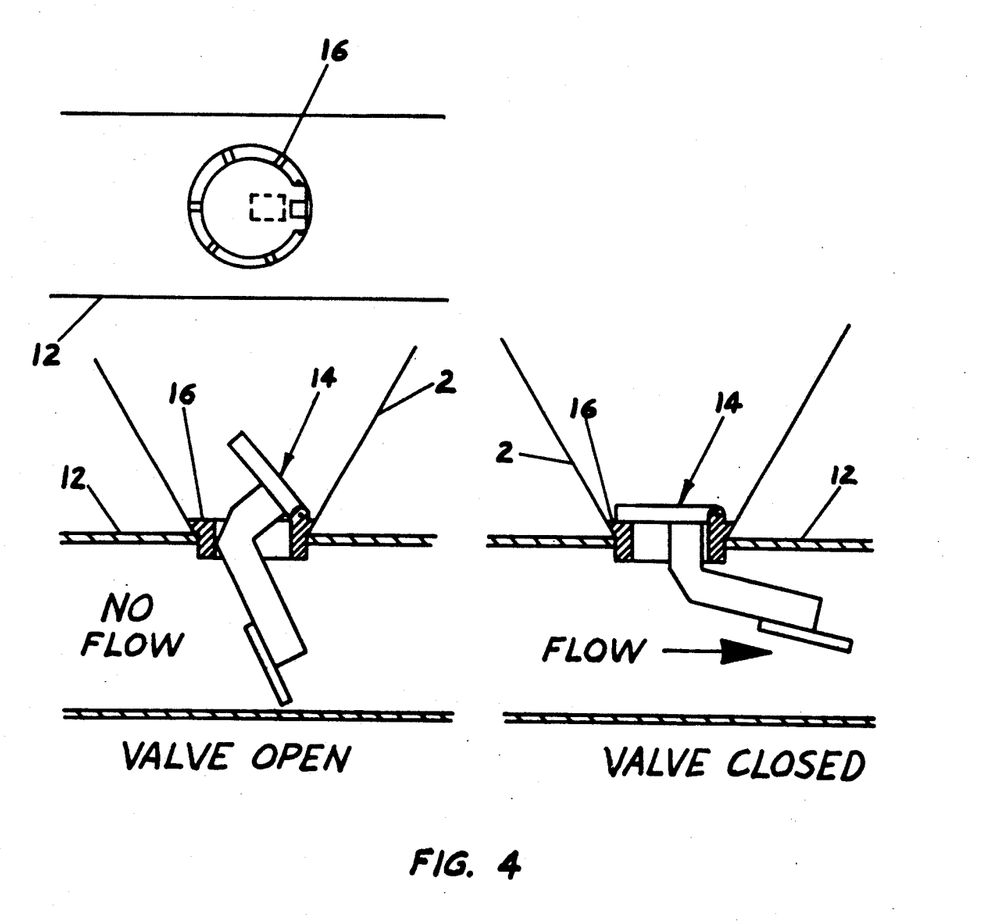
FIG. 4 shows a second embodiment of valve means.

At the conduit 12 opening to the chamber 2 is a flow control valve 14, two possible types of which are shown in FIG. 3 and 4. The purpose of the flow control valves 14 is to maximize linear flow in the conduit 12 as suction is applied and to limit the flow of water from the individual chambers 2 during withdrawal. This will assure a more even flow along the entire length of conduit 12 and will increase the water velocity within the conduit 12 so that all or most of the particle matter and precipitate is swept along and removed with each removal cycle. Notches will be made in the upper surface of the valve seat 16 so that a perfect seal is not obtained. The reason for this is so that accumulated particle matter and precipitate that did not initially enter the conduit 12 and may have accumulated on the walls of the chamber 2 will be drawn into the conduit 12 when the suction is activated.

The receiving conduits 12 are placed at set intervals and connected to an underlying frame 18 so that planar integrity is maintained between the chambers 2. The entire sheet 4 of chambers and receiving conduits 12 is connected to an inflatable raft 20 so that the entire apparatus can be floated into position within the water body 6 and sunk at the desired location. The raft 20 can be inflated at any time to raise the apparatus for removal, maintenance, or relocation.

Figure 5:
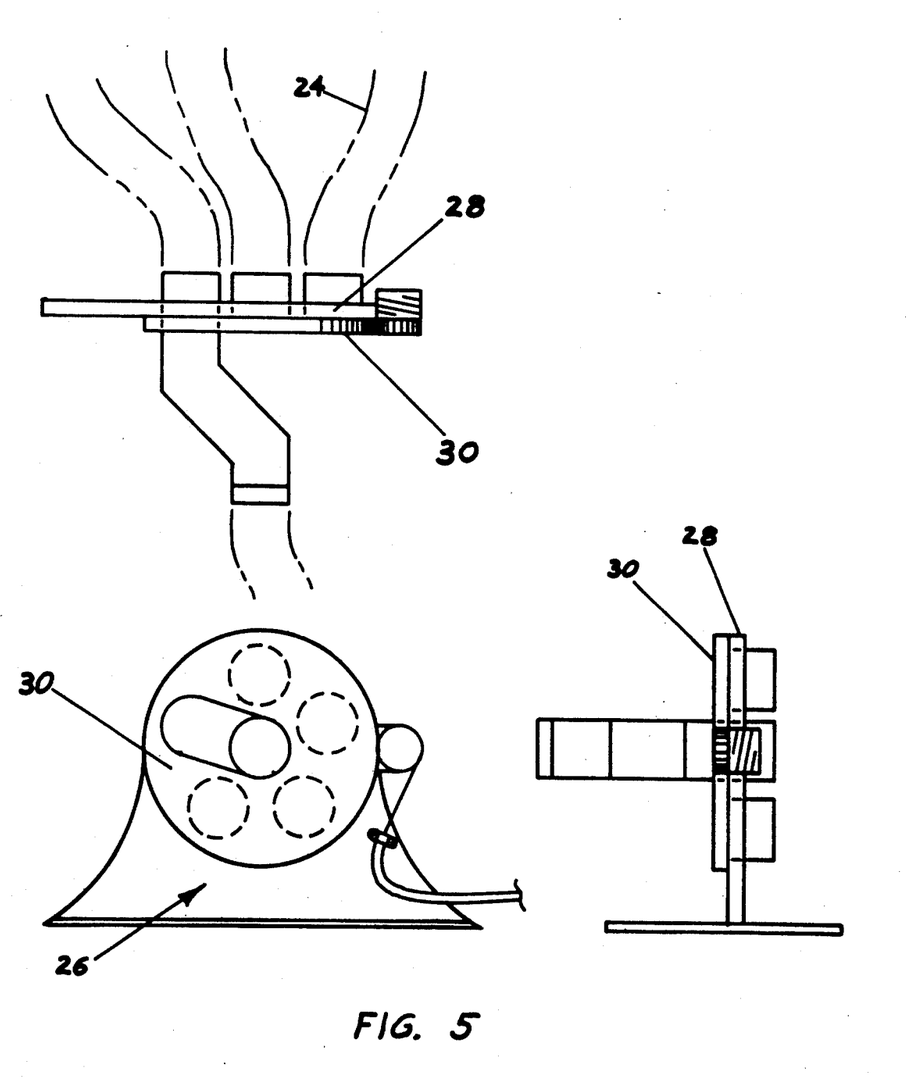
FIG. 5 shows chamber selection means.

In most cases it will be desirable to apply suction to only one receiving conduit 12 at a time during the removal phase of the cycle so that maximum flow is achieved with minimal pump 22 size. To achieve this, each receiving conduit 12 will be attached to tubes 24 which will be attached to a tube selector 26. The tube selector 26 will comprise two disks, the stationary disk 28 with the proper number of openings and connections to accommodate the number of tubes 24 connected to it. These connections will be arranged in a concentric pattern. The rotating disk 30 will have a single opening which will rotate in the same plain and same radius as the fixed openings in a pulsating motion stopping at each fixed opening long enough to draw the water and particle matter from the tube 24. The rotational force may be applied by a cable assembly 46 connected to the pump 22 motor.

The single opening on the rotating disk 30 will be connected to a suction pump 22 or other flow producing mechanism. The withdrawn material and water will be piped 32 to a suitable disposal 34 or recovery area. The most distal chambers may not receive flow control valves so that water through these openings can be maximized for the lateral flow needed in the conduit.

An additional portion of this invention will be a chemical precipitating mechanism comprised of a chemical mix tank 36, a delivery pump 38 or controller, suitable tubing 40, and a buoyant dispersal head 42. This equipment would disperse the appropriate chemical precipitate over the center of the submerged removal sheet 4, the floc would form and settle through the water column, the precipitate would settle in the collection chambers 2 and concentrate in the receiving conduits 12, the withdrawal cycle would activate removing the accumulated particle matter and precipitate.

In full operation, the method would work as follows in an open water body such as a lake or pond:

During the day the particle matter would "rain" down through the water column from natural die off of organic matter and from wind and wave disturbed detritus. As this matter enters the sheltered area of the chambers 2, it would be confined and would eventually concentrate at the funnel apexes 10 and in the receiving conduit openings. At some time during the day the suction pump 22 would be activated thus producing flow within each conduit 12 in its turn. The accumulated particle matter and its associated nutrients would thus be drawn out of the conduit 12 for disposal.

To speed the nutrient and particle removal process, the chemical feed portion of the apparatus could be activated. In this case the precipitating chemical slurry from the mix tank 36 would be pumped via tubing 40 to the distribution head 42 centered at the water surface over the sheet 4. The predetermined amount of slurry would be diffused over the expanse of the sheet 4. This would likely be timed to coincide with the usual calm period of early evening. In a short time the precipitate would form entrapping small particles and reacting with dissolved nutrients. This precipitate would settle downward and within a few hours be concentrated at the funnel apexes 10 and in the receiving conduits 12. The suction pump 22 would then be activated and the precipitate removed as described in the preceding paragraph.

One advantage of this invention is that it would remove significant amounts of nutrients from large bodies of water in a short time. For example, I have calculated that one acre of sheet in a 200 acre lake would remove 63 Kg of phosphorus from the lake water in one 200 day season cycling once per day if the starting phosphorus concentration were 0.045 mg/l (well into the eutrophic concentrations) and there were no further inputs. The concentration at the end of the season in this hypothetical case would be 0.019 mg/l, well into the oligotrophic range. The 63 Kg of phosphorus, if incorporated into plant biomass at the normal rate of 0.05 percent phosphorus wet weight, would have resulted in 126 metric tons of weeds and algae. Of course in real lakes phosphorus inputs continue throughout the year but the example illustrates the magnitude of removal potential of this invention.

Another advantage of this invention is that it can be installed in almost any existing water body. The ideal is to have about four meters of water depth over the sheet for maximum removal potential, but less would be acceptable or a small portion of the bottom could be dredged out to accommodate the sheet.

This invention also has the advantage of adapting size and cycling frequency to fit the local conditions. For example, a larger area of the lake than the 0.5 percent used in the above example could be installed with the sheet temporarily to speed the lake's recovery and then some of the modules re-floated and removed for use elsewhere. Or, the frequency of the cycling could be increased or decreased to obtain certain water quality goals.

Flexibility is also inherent in the chemical feed system where different chemical precipitates may be used to accommodate particular waters or an algicide may be injected over the sheet to speed the process of removing nuisance algal blooms.

Another advantage is the relatively low cost of manufacturing this invention using existing processes and materials. Plastic materials would be used when possible in the chambers, conduit tubes, raft, flow control valves, and tube selector. The frame would likely be of flat steel for lateral stability and to furnish weight to keep the sheet in place on the bottom. It is also expected that the entire apparatus would be shipped in separate pieces and assembled on site into interlocking modules to accommodate the desired size.

It is also noted that this invention accomplishes its task largely out of sight of riparian residents so aesthetic considerations are minimized. Except for the chemical distribution head, the apparatus does not need to be removed in the winter to prevent ice damage. The amount of water removed in one cycle would be relatively small (about a single of volume of each conduit) therefore the nutrients and particles would be greatly concentrated and disposal or recovery thus simplified.

The descriptions of this invention have centered around nutrient and particle removal of lakes and ponds but many variations are possible and the preceding descriptions are not meant to limit the application and claims of this invention. For example, the shape of the funnels can be hexagonal or any other shape that permits sufficient surface continuity and attachment to the receiving tubes. The funnels can be of rigid material or porus material depending on the size and application of the sheet. The funnel apex flow control valve could be of different configuration and be operated electronicly or hydraulically. The tube selector could be more rectangular and have a common header and the activated tube selected by valves in each tube. Also the method herein described and proposed can be used for concentrating and removing particles and precipitates other than organic matter from lakes and ponds. For example, the method may be used in the food industry for collecting certain starches or other foodstuffs. Or it may be used in mining operations or waste recovery operations for removal of certain valuable materials. It would be feasible to invert the entire apparatus and, with a few modifications, trap and remove ascending buoyant material near the surface such as oils or certain cyanobateria. Accordingly, the scope of this invention should be determined by the appended claims and their legal equivalents and not by the embodiments illustrated and described.

CITATIONS (1) Carignan, R. and R. J. Flett "Postdepositional mobility of phosphorus in lake sediments" 1981 26: 361–366 *Limnology and Oceanography*.

(2) Fallon, Robert D. and Thomas D. Brock "Planktonic blue-green algae: Production, sedimentation, and decomposition in Lake Mendota, Wis." 1980 *Limnology and Oceanography* 25: 72–88.

(3) Kadwell, R. J. "Treatment of Inflow: A case study of Fountain and Albert Lea Lakes, Southern Minnesota" 1977 Presented at the Mechanics of Lake Restoration Conference, Madison, Wis. April 25–28.

(4) Water Pollution Control Federation "Nutrient Control, Manual of Practice No. FD-7" 1983.

(5) Morency, David A. and George S. Edwards "Response to Aluminum Sulfate Application and Aquatic Plant Harvesting to Two Washington Lowland Lakes" 1984 Proceedings of the Lake and Reservoir Management: Practical Applications, North American Lake Management Society Pg. 94–100.

(6) Uttormark, Paul D. "General Concepts of Lake Degradation and Lake Restoration" 1978 Proceedings of a National Conference, Lake Restoration Pg. 65–69.

(7) Bloesch J., P. Stadelmann, and H. Buhrer "Primary production, mineralization, and sedimentation in the euphotic zone of two Swiss Lakes" 1977 *Limnology and Oceanography* 22: 511–526.

(8) Gachter, Rene and Antonin Mares "Does settling seston release soluble reactive phosphorus in the hypolimnion of Lakes?" 1985 *Limnology and Oceanography* 30: 364–371.

(9) Soltero, Raymond A. et al "Lake Restoration: Medical Lake, Wash.38 1981 *Journal of Freshwater Ecology* 1:2 155-165.

(10) Ferrante, J. G. and J. I. Parker "Transport of diatom frustules by copepod fecal pellets to the sediments of Lake Michigan" 1977 *Limnology and Oceanography* 22: 92-98.

(11) Hargrave, Barry T. and Noel M. Burns "Assessment of sediment trap collection efficiency" 1979 *Limnology and Oceanography* 24: 1124–1136.

I claim:

1. A method of treating a body of water to decrease suspended particle matter and nutrient load thereof, comprising the steps of:
   a) providing and positioning a plurality of collection chambers connected side-by-side in a two dimensional array supported upon a horizontally movable raft in the body of water such that an unconfined region of the liquid above or below the array can be treated,
   b) introducing a chemical precipitating agent to said region to form precipitate that reduces said nutrient load,
   c) capturing the precipitate and particle matter in said region in the collection chambers as said precipitate and said particle matter move toward said collection chambers while the collection chambers are communicated to a receiving conduit, and
   d) periodically removing the captured precipitate and particle matter by establishing a pressure on the receiving conduit to cause liquid flow therethrough that is effective to carry said captured precipitate and particle matter through said receiving conduit for discharge therefrom to a disposal location.

2. The method of claim 1 including introducing the chemical precipitating agent to said region from a dispenser disposed on the array at a distance therefrom.

3. The method of claim 1 wherein a suction pressure is periodically established on the receiving conduit to remove said precipitate and particle matter.

4. The method of claim 1 wherein said collection chambers are made of flexible plastic sheeting attached to said receiving conduit and said sheeting is maintained in a suitable shape for collection of said precipitate and said particle matter by floating a portion of said sheeting remote from the receiving conduit.

5. The method of claim 1 wherein said precipitate and particle matter are captured in a section of each collection chamber defined by sloping sides so as to channel and concentrate said precipitate and particle matter into a reception area of the receiving conduit.

6. The method of claim 1 including moving a flow control valve between each collection chamber and the receiving conduit by the liquid flow established in the receiving conduit in step d) so as to restrict liquid flow from each collection chamber to the receiving conduit.

7. The method of claim 6 wherein the flow control valve includes a cap for restricting communication between each collection chamber and the receiving conduit and a tailpiece connected to the cap and extending into said receiving conduit such that, in the absence of liquid flow in said receiving conduit, the tailpiece holds the cap in an open position to allow said precipitate and said particle matter to enter said receiving conduit and such that, in response to the presence of said liquid flow in said receiving conduit, the tailpiece moves the cap in a direction to restrict communication between the collection chamber and said receiving conduit.

8. The method of claim 6 wherein the flow control valve includes a first ball of low specific gravity positioned above the receiving conduit and connected by a line to a second ball of higher specific gravity positioned in said receiving conduit such that, in the absence of liquid flow in said receiving conduit, the first ball is buoyed to an open position to allow said precipitate and said particle matter to enter said receiving conduit and such that, in response to the presence of liquid flow in said receiving conduit, the second ball is drawn by said liquid flow to move the first ball in a direction to restrict communication between the collection chamber and said receiving conduit.

9. The method of claim 1 including positioning the collection chambers in the body of water by supporting them on an inflatable/deflatable platform.

10. The method of claim 1 including removing said precipitate and particle matter from a first plurality of collection chambers via a first common receiving conduit in communication therewith and then removing said precipitate and particle matter from a second plurality of collection chambers via a second common receiving conduit in communication therewith.

11. The method of claim 10 wherein said precipitate and particle matter is removed from the first plurality of collection chambers and then from the second plurality of collection chambers by sequentially connecting the first and second receiving conduits to a common pressure establishing device.

12. The method of claim 11 wherein the first and second receiving conduits are sequentially connected to the common pressure establishing device by a conduit selector having a rotating disk with an opening that is sequentially communicated with the first and second receiving conduits such that only one of said first and second receiving conduits is connected to said device at a time.

13. A method of treating a body of liquid to remove particle matter, comprising the steps of:
   a) providing and positioning a plurality of collection chambers connected side-by-side in a two dimensional array supported upon a horizontally movable raft in the body of liquid such that an unconfined region of the liquid above or below the collection chambers can be treated,
   b) capturing particle matter in said region as it moves toward the collection chambers while said collection chambers are communicated to a receiving conduit, and
   c) periodically removing the captured particle matter from the collection chambers by establishing a pressure on the receiving conduit 1) to cause liquid flow therethrough that is effective to carry the captured particle matter through the receiving conduit for discharge therefrom to a disposal location and 2) to actuate a flow control valve between each collection chamber and the receiving conduit to restrict communication therebetween so as to increase liquid flow velocity in said receiving conduit and thereby assist in carrying the particle matter therethrough to the disposal location.

14. The method of claim 13 including introducing a chemical precipitating agent to said region to form precipitate that is captured by said collection chambers and is removed with the particle matter by establishing said pressure on the receiving conduit.

15. The method of claim 13 wherein a suction pressure is periodically established on the receiving conduit to remove the particle matter.

16. The method of claim 13 wherein said collection chambers are made of flexible plastic sheeting attached to said receiving conduit and said sheeting is maintained in a suitable shape for collection of particle matter by floating a portion thereof remote from the receiving conduit.

17. The method of claim 13 wherein the particle matter is captured in a section of each collection chamber defined by sloping sides so as to channel and concentrate the particle matter into a reception area of the receiving conduit.

18. A method of treating a body of liquid to remove buoyant matter, comprising the steps of:
 a) providing and positioning a plurality of collection chambers connected side-by-side in a two dimensional array supported upon a horizontally movable raft in the body of liquid such that the collection chambers face downwardly for treating an unconfined region of the liquid below the collection chambers,
 b) capturing buoyant matter in said region as it ascends toward the collection chambers while said collection chambers are communicated to a receiving conduit, and
 c) periodically removing the captured particle matter from the collection chambers by establishing a pressure on the receiving conduit to cause liquid flow therethrough that is effective to carry the captured buoyant matter through the receiving conduit for discharge therefrom to a disposal location.

19. The method of claim 18 including actuating a flow control valve between each collection chamber and the receiving conduit by the liquid flow through the receiving conduit to restrict communication therebetween so as to increase liquid flow velocity in said receiving conduit and thereby assist in carrying the buoyant matter therethrough to the disposal location.

20. Apparatus for treating a body of water to decrease suspended particle matter and nutrient load thereof, comprising:
 a) a plurality of collection chambers interconnected side-by-side in a two dimensional array supported on a horizontally movable raft and communicated to a receiving conduit, said collection chambers being positionable in a horizontal orientation in the body of water such that particle matter and precipitate in an unconfined region of the liquid above or below the array is captured by said collection chambers as the particle matter and precipitate move toward said collection chambers and means for horizontally positioning said raft at selective locations on said body of water,
 b) means cooperably associated with the array for introducing a chemical precipitating agent to said region to form a precipitate that reduces nutrient load, and
 c) means for periodically establishing a pressure on the receiving conduit to cause liquid flow therethrough that is effective to carry the captured particle matter and precipitate through the receiving conduit for discharge therefrom to a disposal location.

21. The apparatus of claim 20 wherein said means for introducing a chemical precipitating agent to said region is disposed on said array to introduce said agent at a distance from said array.

22. The apparatus of claim 20 wherein the chemical precipitating means comprises a dispenser supported on said array above the collection chambers.

23. The apparatus of claim 20 wherein said means for establishing said pressure comprises a suction pressure pump.

24. The apparatus of claim 20 wherein said collection chambers comprise flexible plastic sheeting attached to said receiving conduit and float means attached at a portion of said sheeting to configure the sheeting in a suitable shape for collection of particle matter and precipitate.

25. The apparatus of claim 24 wherein each collection chamber configuration includes sloping sides so as to channel and concentrate the particle matter into a reception area of the receiving conduit.

26. The apparatus of claim 20 including a flow control valve between each collection chamber and the receiving conduit, said valve being movable by the liquid flow established in the receiving conduit so as to restrict liquid flow from each collection chamber to the receiving conduit.

27. The apparatus of claim 26 wherein the flow control valve includes a cap for restricting communication between each collection chamber and the receiving conduit and a tailpiece connected to the cap and extending into said receiving conduit such that, in the absence of liquid flow in said receiving conduit, the tailpiece holds the cap in an open position to allow particle matter and precipitate to enter said receiving conduit and such that, in response to the presence of said liquid flow in said receiving conduit, the tailpiece moves the cap in a direction to restrict communication between the collection chamber and said receiving conduit.

28. The apparatus of claim 26 wherein the flow control valve includes a first ball of low specific gravity positioned above the receiving conduit and connected by a line to a second ball of higher specific gravity positioned in said receiving conduit such that, in the absence of liquid flow in said receiving conduit, the first ball is buoyed to an open position to allow particle matter and precipitate to enter said receiving conduit and such that, in response to the presence of liquid flow in said receiving conduit, the second ball is drawn by said liquid flow to move the first ball in a direction to restrict communication between the collection chamber and said receiving conduit.

29. The apparatus of claim 20 wherein a first plurality of collection chambers are communicated to a first common receiving conduit and a plurality of second collection chambers are communicated to a second receiving conduit.

30. The apparatus of claim 29 including means for sequentially connecting the first and second receiving conduits to a common pressure establishing device.

31. The apparatus of claim 30 wherein the first and second receiving conduits are sequentially connected to the common pressure establishing device by a conduit selector having a rotating disk with an opening that is sequentially communicated with the first and second receiving conduits such that only one of said first and second receiving conduits is connected to said device at a time.

32. Apparatus for treating a body of liquid to remove particle matter, comprising:
- a) a plurality of collection chambers interconnected side-by-side in a two dimensional array supported on a horizontally movable raft with each collection chamber communicated to a receiving conduit by a flow control valve, said collection chambers being positionable in a horizontal orientation in the body of liquid such that particle matter in an unconfined region of the liquid above or below the array is captured by said collection chambers as the particle matter moves toward said collection chambers and means for horizontally positioning said raft at selective locations on said body of water,
- b) means for periodically establishing a pressure on the receiving conduit to cause liquid flow therethrough that is effective to carry the collected particle matter through the receiving conduit for discharge therefrom to a disposal location, and
- c) each flow control valve being open in the absence of liquid flow in the receiving conduit and being actuable by said liquid flow to restrict communication between the collection chamber and the receiving conduit so as to increase liquid flow velocity in said receiving conduit and thereby assist in carrying the particle matter therethrough for discharge to the disposal location.

33. The apparatus of claim 32 including means for introducing a chemical precipitating agent to said region of the liquid to form precipitate that is captured by said collection chambers and is removed with the particle matter by establishing said pressure on the receiving conduit.

34. Apparatus for treating a body of liquid to remove buoyant matter, comprising:
- a) a plurality of collection chambers interconnected side-by-side in a two dimensional array supported on a horizontally movable raft and communicated to a receiving conduit, said collection chambers being positionable in a horizontal orientation in the body of liquid such that the collection chambers face downwardly for treating an unconfined region of the liquid below the array by capturing ascending buoyant matter therein and means for horizontally positioning said raft at selective locations on said body of water, and
- b) means for periodically establishing a pressure on the receiving conduit to cause liquid flow therethrough that is effective to carry the captured buoyant matter through the receiving conduit for discharge therefrom to a disposal location.

35. The apparatus of claim 34 including a flow control valve between each collection chamber and the receiving conduit, each flow control valve being open in the absence of liquid flow in the receiving conduit and being actuable by said liquid flow to restrict communication between the collection chamber and the receiving conduit so as to increase liquid flow velocity in said receiving conduit and thereby assist in carrying the buoyant matter therethrough for discharge to the disposal location.

* * * * *